(12) United States Patent
Paland

(10) Patent No.: US 6,668,547 B2
(45) Date of Patent: Dec. 30, 2003

(54) METHOD AND APPARATUS FOR PROTECTING THE CATALYTIC CONVERTER OF AN INTERNAL COMBUSTION ENGINE FROM OVERHEATING

(75) Inventor: Thomas Paland, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 200 days.

(21) Appl. No.: 09/785,660

(22) Filed: Feb. 20, 2001

(65) Prior Publication Data
US 2001/0020362 A1 Sep. 13, 2001

(30) Foreign Application Priority Data

Feb. 17, 2000 (DE) .......................................... 100 07 242

(51) Int. Cl.$^7$ ................................................. F01N 3/00
(52) U.S. Cl. ........................... 60/285; 60/274; 60/277; 60/284; 123/406.44; 123/406.55; 701/105
(58) Field of Search ............................. 60/274, 284, 285, 60/277, 286; 123/406.44, 406.45, 406.55, 406.52; 701/105, 113

(56) References Cited

U.S. PATENT DOCUMENTS

RE36,737 E * 6/2000 Brehob et al. ............... 123/299
6,212,879 B1 * 4/2001 Nishimura et al. ........... 60/274
6,212,884 B1 * 4/2001 Ohuchi et al. ................ 60/285
6,311,482 B1 * 11/2001 Yamashita .................... 60/285

FOREIGN PATENT DOCUMENTS

| DE | 36 27 437 C2 | 2/1988 |
| DE | 43 34 865 A1 | 4/1995 |

* cited by examiner

Primary Examiner—Binh Tran
(74) Attorney, Agent, or Firm—Crowell & Moring LLP

(57) ABSTRACT

A method and an apparatus for protecting the catalytic converter in the exhaust system of an internal combustion engine from overheating in the case of retarded ignition angles, in which a characteristic map (10) provides an engine-speed- and/or load-dependent ignition angle (Zu) that can be specified without time restriction. The ignition angle (Zu) is compared in a comparison device (12) with an optimum ignition angle (OZ) calculated in a parameter-dependent manner and, in the case of an optimum ignition angle (OZ) that is more retarded than the unrestricted specifiable ignition angle (Zu), this optimum ignition angle (OZ) is used for ignition of the internal combustion engine during specifiable time periods in alternation with the ignition angle (Zu), which can be specified without time restriction, while, in the opposite case, only the optimum ignition angle (OZ) is used for this purpose.

17 Claims, 2 Drawing Sheets

METHOD AND APPARATUS FOR PROTECTING THE CATALYTIC CONVERTER OF AN INTERNAL COMBUSTION ENGINE FROM OVERHEATING

BACKGROUND AND SUMMARY OF THE INVENTION

This application claims the priority of German Patent document 100 07 242.9 filed Feb. 17, 2000, the disclosure of which is expressly incorporated by reference herein.

The invention relates to a method for protecting the catalytic converter in the exhaust system of an internal combustion engine from overheating in the case of retarded ignition angles.

A catalytic converter protection apparatus known from German Patent DE 36 27 437 C2 detects overheating of the catalytic converter indirectly through the evaluation of the output signal of the lambda sensor. If overheating is detected, this is merely indicated, and no measures are taken to counteract the overheating.

In a control device described in German Reference DE 43 34 865 A1, the ignition angle retardation specified in the warm-up phase is stopped or at least reduced in the event of potential overheating, i.e. the exhaust-gas temperature is reduced by advancing the ignition angle during the warm-up phase. The manner in which this is achieved is not described. Monitoring and avoidance of overheating of the catalytic converter in normal operation are not provided.

The object of the present invention is to prevent the thermal destruction of the catalytic converter that occurs with excessively retarded ignition angles in an effective manner in all operating states while as far as possible maintaining the safety and comfort characteristics without restriction.

In the case of excessively retarded ignition angles, there is the risk of overheating and destruction of the catalytic converter. To avoid this, a parameter-dependent characteristic map is advantageously achieved by defining, in the respective operating state, an ignition angle that acts as a limiting ignition angle and allows more advanced ignition angles for any desired period of time. Only when a calculated optimum ignition angle exceeds this limiting ignition angle in the retarded direction is there a risk of overheating. To make the loss of comfort that must be accepted as small as possible and maintain a control response of vehicle-dynamics programs and transmission programs as optimum as possible, the respectively optimum angle and, in a subsequent recovery phase, the unrestrictedly specifiable limiting ignition angle, are advantageously specified in alternation by a timing device. This is an effective means of stopping or limiting the heating of the catalytic converter, making it possible to minimize the effects on driving operation.

The timing is expediently engine-speed-dependent, i.e. the time periods are specified at least as a function of the engine speed, allowing them to be optimized with regard to the respective operating state with a view to preventing overheating.

In an advantageous refinement, the time periods for the alternating switch between the two ignition angles is specified by means of a ramp generator using a ramp function, preferably through up/down ramps.

However, because excessively retarded ignition angles could lead to overheating, the optimum ignition angle is advantageously limited by means of a limiting device, using an ignition angle retarded to the maximum extent. In this context, the ignition angle retarded to the maximum extent is preferably specified by a characteristic map or a characteristic at least as a function of the engine speed.

Since the risk that the catalytic converter will overheat is significantly lower in the warm-up phase, the unrestrictedly specifiable ignition angle and/or the ignition angle retarded to the maximum extent can then be retarded by a warm-up ignition angle, allowing more retarded optimum ignition angles in this phase, leading to enhanced comfort and better quality of control, especially in the warm-up phase.

During certain specifiable dynamic processes, the cyclic change to the ignition angle, which can be specified without time restriction, can be switched off, i.e. in such special situations the optimum ignition angle is then specified even if this is more retarded than the unrestrictedly specifiable ignition angle. Such brief processes do not lead to overheating of the catalytic converter and it is therefore possible to accept more retarded ignition angles in these situations with a view to better dynamic processes.

If icing is detected at the throttle valve and/or at other locations, the system switches to a correspondingly optimized ignition-angle characteristic map, which is then used for ignition of the internal combustion engine. Thus, there is also a departure from the specification of the ignition angle in accordance with the invention in such special situations.

Other objects, advantages and novel features of the present invention will become apparent from the following detailed description of the invention when considered in conjunction with the accompanying drawings.

BRIEF DESCRIPTION OF THE DRAWINGS

An exemplary embodiment of the invention is illustrated in the drawing and explained in greater detail in the following description. In the drawing.

DETAILED DESCRIPTION OF THE PREFERRED EMBODIMENT

Figure 2:
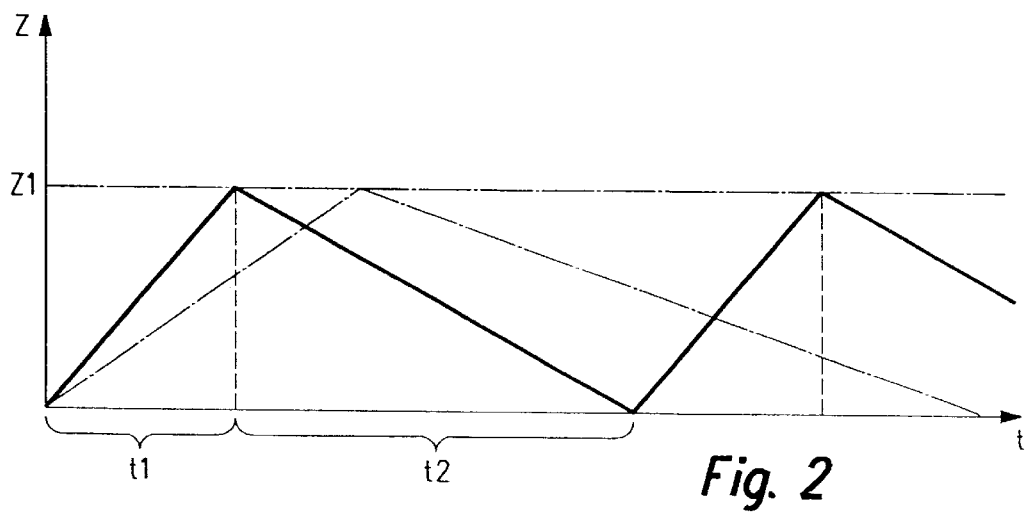
FIG. 2 shows a diagram illustrating the timing device.
Figure 3:
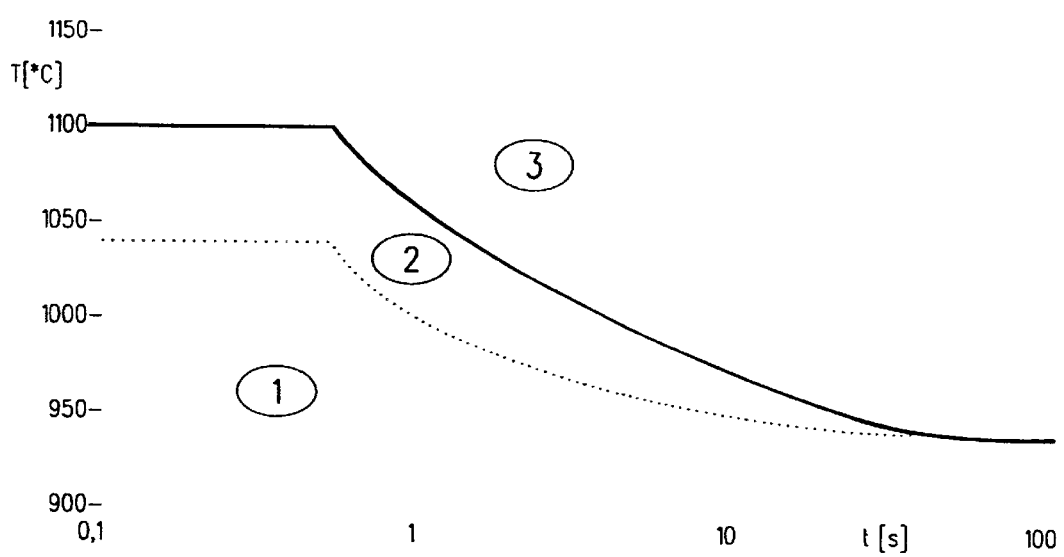
FIG. 3 shows a diagram to illustrate the temperature problems with the catalytic converter.

Retarded ignition angles on an applied-ignition internal combustion engine, e.g. an Otto engine, lead to higher thermal loading on the catalytic converter in the exhaust system of the internal combustion engine since as yet unburnt components of the exhaust gas then burn in the catalytic converter and are converted into heat for example. The diagram in FIG. 3 shows characteristics that serve to illustrate the maximum permissible temperature loading of the catalytic converter. The area 3 above the continuous characteristic must remain completely excluded, i.e. a maximum temperature of 1100° C. is allowed for a few tenths of a second, for example, while a maximum temperature of 950° C. is allowed for a period of 10 seconds for example. The area 2 between the dotted characteristic and the continuous characteristic represents a range that must be entered no more than about 500 times over the life of the catalytic converter system. The area 1 below the dotted characteristic can be entered or employed any number of times. An important measure for eliminating the threat of overheating and hence destruction of the catalytic converter is to advance the ignition angle for the triggering of combustion. This is explained in greater detail below with reference to FIGS. 1 and 2.

Figure 1:
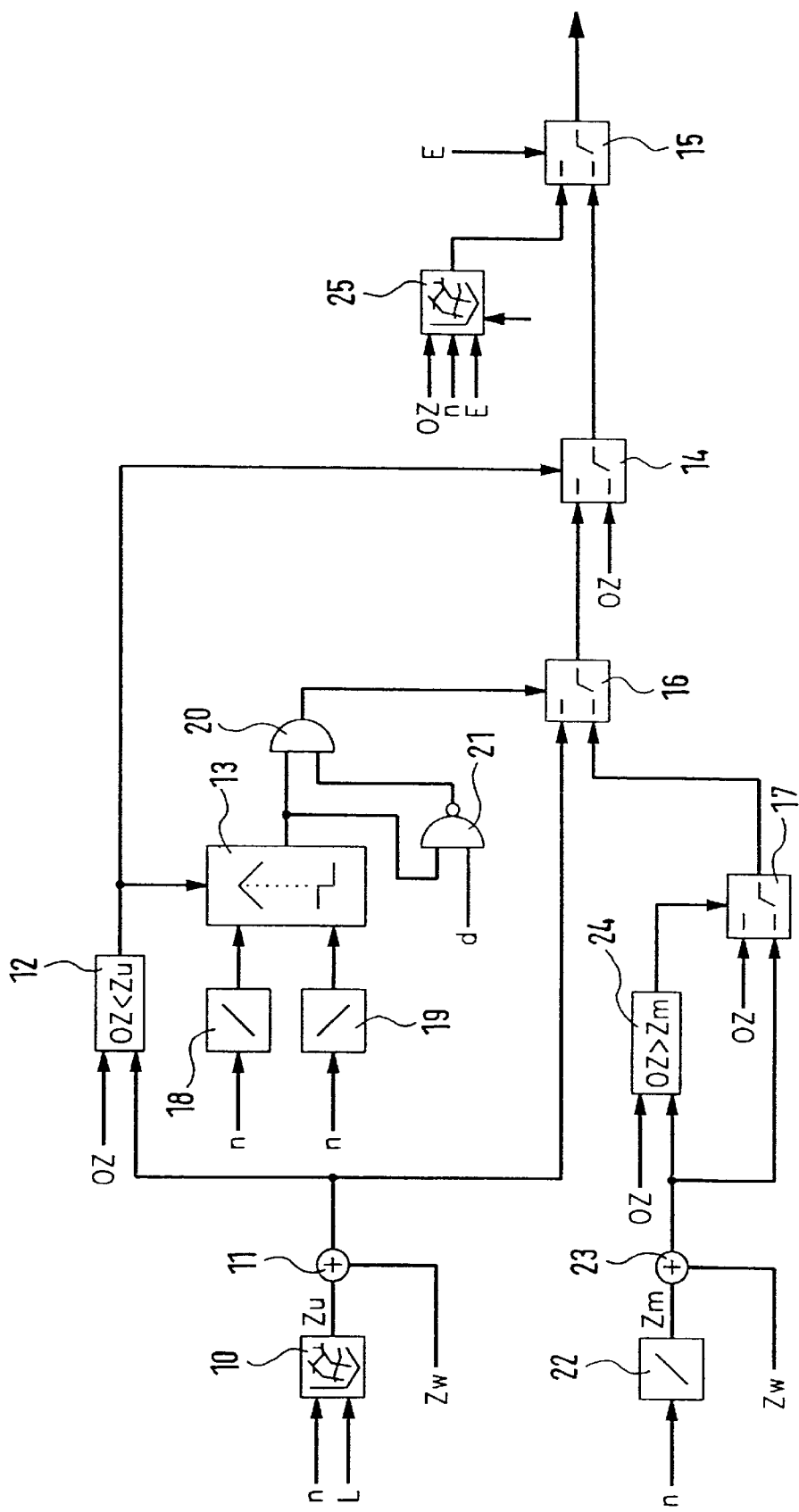
FIG. 1 shows a block diagram of an apparatus for protecting the catalytic converter by adjusting the ignition angle as an exemplary embodiment of the invention.

According to FIG. 1, a characteristic map 10 is used to define an ignition angle Zu as a function of the speed n of the internal combustion engine and the specified load L, this value being specifiable without restriction, there being no risk that the catalytic converter will overheat. This ignition angle Zu, which is not subject to any time limit, thus represents a limiting ignition angle that defines all more advanced ignition angles as permissible. The load L is obtained in a manner known per se from the driver's intention or from automatic engine interventions, such as cruise control, traction control and the like.

During the warm-up phase, a warm-up ignition angle Zw is added in a downstream adding stage 11 to the unrestricted ignition angle Zu, with the result that the unrestricted permitted ignition angle is retarded by this warm-up ignition angle during the warm-up phase. This leads to a desirable more rapid heating of the catalytic converter and to an improved control quality and greater comfort during the warm-up phase.

In a comparison stage 12, the unrestrictedly specifiable ignition angle Zu is compared with an optimum ignition angle OZ. The optimum ignition angle OZ is determined in a conventional parameter-dependent manner (not shown) by means of a characteristic map. The optimum ignition angle OZ is adjusted independently of the effects on the heating of the catalytic converter in such a way that the exhaust gas is as free as possible from pollutants while power is as optimum as possible and fuel consumption is low. If the optimum ignition angle OZ is more advanced than the unrestricted specifiable ignition angle Zu, a timing device 13 remains switched off or inoperative, while a switching stage 14 supplies the optimum ignition angle OZ as an input or desired value to an open-loop or closed-loop ignition control device (not shown) via a further switching stage 15 for the purpose of specifying the ignition angle during combustion in the internal combustion engine.

If the optimum ignition angle is more retarded than the unrestrictedly specifiable ignition angle Zu, on the other hand, the switching stage 14 is switched over and the timing device 13 is switched on. This device contains a ramp generator with a respective up ramp and a subsequent down ramp, as illustrated in FIG. 2. For the duration T1 of the up ramp, a switching stage 16 is switched via the output of the timing device in such a way that the optimum ignition angle OZ is supplied via a switching stage 17, switching stage 16, switching stage 14 and switching stage 15 to the output for the purpose of specifying the effective ignition angle, provided that the optimum ignition angle does not exceed a maximum permitted retarded ignition angle. During the subsequent time period T2 of the down ramp, switching stage 16 is switched over, with the result that the unrestricted specifiable ignition angle Zu is now specified via switching stage 16, switching stage 14 and switching stage 15 in a recovery phase or cooling phase. This cyclic switching between the optimum ignition angle OZ and the unrestricted specifiable ignition angle Zu continues until the optimum ignition angle falls below the unrestricted specifiable ignition angle Zu in the advanced direction, as is ascertained by the comparison stage 12.

The time periods t1 and t2 produced by the ramp generator contained in the timing device 13 are predetermined by the slope of the up ramp and the slope of the down ramp. These, in turn, are determined by two ramp control stages 18 and 19 as a function of the engine speed n. A ramp counter contained in the ramp generator counts up and down alternately between two specified readings, e.g. between a reading of zero and a reading Z1. The counting steps are specified by the two ramp control stages 18, 19, giving different ramp slopes and hence different times t1 and t2 in the case of different speed-dependent counting steps. FIG. 2 shows a ramp sequence illustrated by a continuous line and a ramp sequence illustrated by a chain-dotted line, the last-mentioned ramp sequence specifying larger time periods.

During the upward-counting operations, there is a zero signal at the output of the timing device 13, and this zero signal keeps switching stage 16 in the position illustrated. During the down ramps, on the other hand, there is a 1 signal and this switches over switching stage 16, allowing through the ignition angle Zu, which can be specified without time restriction, in the recovery phase or cooling phase. In the exemplary embodiment, the recovery time periods are longer than—essentially twice as long as—the time periods in which the optimum ignition angle OZ is specified. However, this can also vary in a parameter-dependent manner or with a different configuration.

Dynamic processes could be impaired by the alternate specification of different ignition angles by switching over switching stage 16. For this reason, a dynamic stage comprising an AND element 20 and a NAND element is inserted between the output of the timing device 13 and the control input of switching stage 16. A dynamic signal d produced during specifiable dynamic processes is applied to one input of the NAND element 21, the output of the timing device 13 being connected to the second input. The output of the NAND element 21 and the output of the timing device 13 are connected to the two inputs of the AND element 20, the output of which is connected to the control input of switching stage 16. If such a dynamic signal d occurs, a zero signal is applied continuously to the control input of switching stage 16, irrespective of the output signal at the timing device 13, with the result that no switching operation occurs and only the optimum ignition angle OZ is allowed through during the occurrence of this dynamic signal d.

If an extremely retarded optimum ignition angle OZ occurs, the catalytic converter might overheat despite the switching operations of switching stage 16. For this reason, the optimum ignition angle OZ is limited to a maximum permissible ignition angle Zm or ignition angle Zm retarded to the maximum extent. This maximum ignition angle Zm is specified as a function of engine speed by means of a characteristic by a characteristic stage 22. The characteristic stage 22 could also be replaced by a characteristic map if further parameters are to be used in forming this maximum ignition angle. As with the characteristic map 10, a warm-up ignition angle Zw, by means of which the maximum ignition angle Zm is correspondingly retarded, is added to the output signal of the characteristic stage 22 by an adding stage 23 during the warm-up phase, as already explained.

The signal appearing at the output, i.e., the maximum ignition angle Zm outside the warm-up phase, is compared with the optimum ignition angle OZ in a comparison stage 24. If the optimum ignition angle OZ is larger, i.e. more retarded, than the maximum ignition angle Zm, the maximum ignition angle Zm is passed through by appropriate activation of switching stage 17, as illustrated in FIG. 1. Otherwise, the optimum ignition angle OZ is passed through.

If icing of the throttle valve is detected or icing or undershooting of a minimum temperature occurs at other points, an ice-up signal E is formed, by means of which switching stage 15 is switched to a corresponding characteristic map 25, which is exclusively responsible for specifying the ignition angle when such an ice-up signal E occurs. This ignition angle is specified by the characteristic map 25 as a function of the optimum ignition angle OZ, the engine speed n and the ice-up signal E. A further, undesignated, arrow indicates that further parameters can be used for the formation of this ignition angle.

In simpler variant embodiments, it is also possible to dispense with ice-up correction and/or warm-up correction and/or maximum ignition-angle limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for protecting a catalytic converter in the exhaust system of an internal combustion engine from overheating during a retarded ignition angle, said method comprising the steps of:
   supplying a characteristic map having at least one of an engine-speed and a load-dependent specified ignition angle which is specified without time restrictions;
   comparing said specified ignition angle with an optimum ignition angle calculated in a perimeter-dependent manner;
   utilizing said optimum ignition angle for ignition of the internal combustion engine during specifiable time periods in alternation with the specified ignition angle when said optimum ignition angle is more retarded then the specified ignition angle wherein said specifiable timer periods are specified as a function of engine speed;
   utilizing only the optimum ignition angle for ignition of the internal combustion engine when said optimum ignition angle is more advanced then said specified ignition angle.

2. The method according to claim 1, wherein the time periods for two alternating specified ignition angles are specified independently of one another.

3. The method according to claim 1, wherein the time periods are specified by means of up and down ramp functions.

4. A method for protecting a catalytic converter in the exhaust system of an internal combustion engine from overheating during a retarded ignition angle, said method comprising the steps of:
   supplying a characteristic map having at least one of an engine-speed and a load-dependent specified ignition angle which is specified without time restrictions;
   comparing said specified ignition angle with an optimum ignition angle calculated in a perimeter-dependent manner;
   utilizing said optimum ignition angle for ignition of the internal combustion engine during specifiable time periods in alternation with the specified ignition angle when said optimum ignition angle is more retarded then the specified ignition angle;
   utilizing only the optimum ignition angle for ignition of the internal combustion engine when said optimum ignition angle is more advanced then said specified ignition angle, wherein the optimum ignition angle is limited by means of a predetermined ignition angle retarded to a maximum extent.

5. The method according to claim 4, wherein said predetermined ignition angle retarded to the maximum extent is specified by a characteristic or characteristic map as a function of the engine speed.

6. The method according to claim 4 further comprising the step of comparing the optimum ignition angle with the predetermined ignition angle retarded to the maximum extent and providing a limitation of said optimum predetermined ignition angle if the optimum ignition angle is more retarded than the predetermined ignition angle retarded to the maximum extent.

7. A method for protecting a catalytic converter in exhaust system of an internal combustion engine from overheating during a retarded ignition angle, said method comprising the steps of:
   supplying a characteristic map having at least one of an engine-speed and a load-dependent specified ignition angle which is specified without time restrictions;
   comparing said specified ignition angle with an optimum ignition angle calculated in a perimeter-dependent manner;
   utilizing said optimum ignition angle for ignition of the internal combustion engine during specifiable time periods in alternation with the specified ignition angle when said optimum ignition angle is more retarded then the specified ignition angle;
   utilizing only the optimum ignition angle for ignition of the internal combustion engine when said optimum ignition angle is more advanced then said specified ignition angle, wherein at least one of the unrestricted specified ignition angle and the predetermined ignition angle retarded to the maximum extent is retarded by a warm-up ignition angle during the warm-up phase of the internal combustion engine.

8. A method for protecting a catalytic converter in the exhaust system of an internal combustion engine from overheating during a retarded ignition angle, said method comprising the steps of:
   supplying a characteristic map having at least one of an engine-speed and a load-dependent specified ignition angle which is specified without time restrictions;
   comparing said specified ignition angle with an optimum ignition angle calculated in a perimeter-dependent manner;
   utilizing said optimum ignition angle for ignition of the internal combustion engine during specifiable time periods in alternation with the specified ignition angle when said optimum ignition angle is more retarded then the specified ignition angle;
   utilizing only the optimum ignition angle for ignition of the internal combustion engine when said optimum ignition angle is more advanced then said specified ignition angle, wherein a cyclic change to the unrestricted specified ignition angle is switched off during specifiable dynamic processes.

9. A method for protecting a catalytic converter in the exhaust system of an internal combustion engine from overheating during a retarded ignition angle, said method comprising the steps of:
   supplying a characteristic map having at least one of an engine-speed and a load-dependent specified ignition angle which is specified without time restrictions;
   comparing said specified ignition angle with an optimum ignition angle calculated in a perimeter-dependent manner;

utilizing said optimum ignition angle for ignition of the internal combustion engine during specifiable time periods in alternation with the specified ignition angle when said optimum ignition angle is more retarded then the specified ignition angle;

utilizing only the optimum ignition angle for ignition of the internal combustion engine when said optimum ignition angle is more advanced then said specified ignition angle, wherein, if icing is detected at a throttle valve, switching occurs to a corresponding optimized ignition angle characteristic map used for ignition of the internal combustion engine.

10. A device for protecting a catalytic converter in an exhaust system of an internal combustion engine from overheating due to retarded ignition angle, said device comprising:

means for providing a characteristic map having at least one of engine-speed and load-dependent specified ignition angles which can be specified without time restrictions;

means for calculating a perimeter-dependent optimum ignition angle;

a comparison device for comparing said specified ignition angle with said optimum ignition angle and providing an output;

a switching device receiving the output of said comparison device wherein said switching device provides an output which specifies the optimum ignition angle for ignition of the internal combustion engine when said optimum ignition angle is more advanced than said unrestricted specified ignition angle;

a switching arrangement including a timing device wherein said switching arrangement is connected to the output of said comparison device for specifying an ignition angle controlled by said timing device whenever said optimum ignition angle is more retarded than said unrestricted specified ignition angle, whereby said switching arrangement switches between the optimum ignition angle and the unrestricted specified ignition angle during specified time periods.

11. The device according to claim 10, wherein said timing device is controlled as a function of engine speed.

12. The device according to claim 10, wherein said timing device includes a ramp generator.

13. The device according to claim 10 further including a limiting device which limits the optimum ignition angle to a predetermined ignition angle retarded to the maximum extent.

14. The device according to claim 13, wherein said limiting device has an engine speed characteristic map or an engine speed characteristic stage.

15. The system according to claim 10 further comprising a warm-up device for retarding at least one of the unrestricted specified ignition angle and the predetermined retarded to the maximum extent by a warm-up ignition angle during the warm-up phase.

16. The device according to claim 10 further comprising a second switching device which switches off a cyclic changed to the unrestricted specified ignition angle during the specified dynamic processes.

17. The device according to claim 10 further comprising a final switching device for effecting switching to a correspondingly optimized ignition-angle characteristic map when icing is detected at a throttle valve or at other engine locations.

* * * * *